(12) United States Patent
Huang

(10) Patent No.: US 11,905,747 B2
(45) Date of Patent: Feb. 20, 2024

(54) LIFTABLE HINGE MECHANISM, RECIPROCATING ENGAGING MECHANISM AND RELATED AIRTIGHT DEVICE FOR PREVENTING GASEOUS MATTER FROM LEAKAG

(71) Applicant: Wiwynn Corporation, New Taipei (TW)

(72) Inventor: Pai-Chieh Huang, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 515 days.

(21) Appl. No.: 17/109,071

(22) Filed: Dec. 1, 2020

(65) Prior Publication Data

US 2022/0065010 A1 Mar. 3, 2022

(30) Foreign Application Priority Data

Aug. 27, 2020 (TW) ................................. 109129348

(51) Int. Cl.
*E05D 3/02* (2006.01)
*F16H 21/16* (2006.01)
*B65D 43/16* (2006.01)

(52) U.S. Cl.
CPC ............. *E05D 3/02* (2013.01); *B65D 43/167* (2013.01); *F16H 21/16* (2013.01); *E05Y 2800/12* (2013.01); *E05Y 2900/602* (2013.01)

(58) Field of Classification Search
CPC .. E05D 3/04; E05D 3/022; E05D 3/02; B65D 43/167; F16H 21/16; E05Y 2800/12; E05Y 2900/602

(Continued)

(56) References Cited

U.S. PATENT DOCUMENTS

| 2,183,448 | A | * | 12/1939 | Drane | ................... | F16K 17/196 |
| | | | | | | 70/159 |
| 3,514,009 | A | * | 5/1970 | Davis | ...................... | F16J 13/18 |
| | | | | | | 220/849 |

(Continued)

FOREIGN PATENT DOCUMENTS

| CN | 104343302 A | * | 2/2015 |
| CN | 210739117 U | | 6/2020 |

(Continued)

*Primary Examiner* — J. Gregory Pickett
*Assistant Examiner* — Niki M Eloshway
(74) *Attorney, Agent, or Firm* — Winston Hsu

(57) ABSTRACT

A liftable hinge mechanism includes a base, a connecting component and a pin. The base has a narrow slot. The connecting component has an axle hole. The pin slidably passes through the narrow slot and rotatably inserts into the axle hole. The connecting component can be rotated and/or shifted relative to the base via the pin. A reciprocating engaging mechanism includes a shaft, a rotary plate, a first engaging component and a linkage module. The rotary plate is rotatably disposed on the shaft. The linkage module is connected between the rotary plate and the first engaging component. Rotation of the rotary plate drives the linkage module to move the first engaging component into a locking mode or an unlocking mode. The liftable hinge mechanism and the reciprocating engaging mechanism are applied to an airtight device with a housing and a cover capable of being folded and unfolded.

18 Claims, 10 Drawing Sheets

(58) Field of Classification Search
USPC .............................. 220/484, 812, 813, 811
See application file for complete search history.

(56) References Cited

U.S. PATENT DOCUMENTS

| | | | | |
|---|---|---|---|---|
| 3,531,823 | A | * | 10/1970 | Cornelius ............... E05D 11/06 <br> 16/361 |
| 4,381,581 | A | * | 5/1983 | Ludvik ................ B65D 43/163 <br> 16/259 |
| 5,186,349 | A | * | 2/1993 | Sakamoto ................ B60R 5/04 <br> 16/361 |
| 2006/0021992 | A1 | * | 2/2006 | Narushima .............. F16J 13/18 <br> 220/817 |
| 2009/0152142 | A1 | * | 6/2009 | Richardson ........ G11B 33/0427 <br> 206/308.1 |
| 2011/0308041 | A1 | * | 12/2011 | Le ...................... E05D 11/1007 <br> 16/248 |

FOREIGN PATENT DOCUMENTS

| | | |
|---|---|---|
| JP | 2003-262103 | 9/2003 |
| TW | 451759 | 8/2001 |

* cited by examiner

LIFTABLE HINGE MECHANISM, RECIPROCATING ENGAGING MECHANISM AND RELATED AIRTIGHT DEVICE FOR PREVENTING GASEOUS MATTER FROM LEAKAG

BACKGROUND OF THE INVENTION

1. Field of the Invention

The present disclosure relates to a liftable hinge mechanism, a reciprocating engaging mechanism and a related airtight device of preventing gaseous matter from leakage, and more particularly, to a liftable hinge mechanism and a reciprocating engaging mechanism with preferred airtight efficiency and a related airtight device of preventing gaseous matter from leakage.

2. Description of the Prior Art

A conventional airtight apparatus puts an object inside an accommodating space of the housing, and a cover is assembled with the housing to seal the accommodating space, so that a water cooling device in the airtight apparatus can cool the object; however, liquid matter of the water cooling device is transformed into gaseous matter by heat, and therefore the airtight apparatus applies stable pressure for the cover to assemble the cover with the housing, so as to prevent the gaseous matter from leakage. The cover has a first side and a second side opposite to each other. The first side is close to a shaft mechanism, and the cover is rotatably disposed on the housing via the shaft mechanism. The second side is far from the shaft mechanism, and the cover can be rotated by pressing the second side or any portion of the cover except the first side. When the cover is folded relative to the housing, the cover presses a section of an annular gasket close to the shaft mechanism, and then presses another section of the annular gasket away from the shaft mechanism in response to the second side of the cover contacting the housing. Thus, uneven pressure applied to the annular gasket results in uneven deformation. Some part of the annular gasket may be pushed out of a groove of the housing or the cover may be deformed due to uneven pressure when the cover of the conventional airtight apparatus is folded, so that the conventional airtight apparatus cannot provide preferred airtight efficiency.

SUMMARY OF THE INVENTION

The present disclosure provides a liftable hinge mechanism and a reciprocating engaging mechanism with preferred airtight efficiency and a related airtight device of preventing gaseous matter from leakage for solving above drawbacks.

According to the claimed disclosure, a liftable hinge mechanism includes a base, a connecting component and a pin. The base has a narrow slot. The connecting component has an axle hole. The pin slidably passes through the narrow slot and rotatably inserts into the axle hole. Multi-dimensionally liftable motion of the connecting component relative to the base is generated via a movement of the pin inside the narrow slot and the axle hole.

According to the claimed disclosure, the narrow slot is a long-type narrow slot, a slot direction of the long-type narrow slot is crossed with a structurally vertical direction of the pin, and the pin is slid inside the long-type narrow slot along the slot direction. narrow slot, a slot direction of the long-type narrow slot is crossed with a structurally vertical direction of the pin, and the pin is slid inside the long-type narrow slot along the slot direction.

According to the claimed disclosure, the base includes two slab portions, each of the two slab portions has the narrow slot, and the connecting component is disposed between the two slab portions.

According to the claimed disclosure, the liftable hinge mechanism further includes a constraining component disposed between the base and the connecting component, two opposite surfaces of the constraining component respectively abutting against the base and the connecting component in a slidable manner.

According to the claimed disclosure, an airtight device of preventing gaseous matter from leakage includes a housing, a cover and a liftable hinge mechanism. The cover is movably assembled with the housing. The liftable hinge mechanism is connected to the housing and the cover. The liftable hinge mechanism includes a base, a connecting component and a pin. The base is disposed on the housing and has a narrow slot. The connecting component connected to the cover and has an axle hole. The pin slidably passes through the narrow slot and rotatably inserts into the axle hole. Multi-dimensionally liftable motion of the connecting component relative to the base is generated via a movement of the pin inside the narrow slot and the axle hole, so as to seal the housing by the cover for preventing the gaseous matter inside the housing from leakage.

According to the claimed disclosure, a reciprocating engaging mechanism includes a shaft, a rotary plate, a first engaging component and a linkage module. The rotary plate is rotatably disposed on the shaft. The linkage module is connected between the rotary plate and the first engaging component. Rotation of the rotary plate drives the linkage module to move and switch the first engaging component between a locking mode and an unlocking mode.

According to the claimed disclosure, the reciprocating engaging mechanism further includes a second engaging component disposed on position corresponding to the locking mode. The first engaging component is switched into the locking mode by inserting into the second engaging component, and further switched into the unlocking mode by being separated from the unlocking mode.

According to the claimed disclosure, the linkage module includes a first guiding bar and a bridging bar. An end of the first guiding bar is connected to the first engaging component for switching the first engaging component into the locking mode or the unlocking mode. The bridging bar is disposed between the rotary plate and the first guiding bar.

According to the claimed disclosure, the linkage module further includes a restraining component adapted to cover the first guiding bar for allowing the first guiding bar to move along a specific direction.

According to the claimed disclosure, the linkage module further includes a transferring component connected to the other end of the first guiding bar, and a second guiding bar disposed between the transferring component and the bridging bar.

According to the claimed disclosure, an amount of the first guiding bar is plural, and an amount of the first engaging component corresponds to the amount of the first guiding bar.

According to the claimed disclosure, an airtight device of preventing gaseous matter from leakage includes a housing, a cover and a reciprocating engaging mechanism. The cover movably is assembled with the housing. The reciprocating engaging mechanism is adapted to constrain a movement of the cover relative to the housing. The reciprocating engaging mechanism includes a shaft, a rotary plate, a first engaging component, a second engaging component and a linkage module. The shaft is disposed on the cover. The rotary plate is rotatably disposed on the shaft. The second engaging component is disposed on the housing. The linkage module is connected between the rotary plate and the first engaging component. Rotation of the rotary plate drives the linkage module to move and switch the first engaging component between a locking mode and an unlocking mode, and the housing is sheltered by the cover via the reciprocating engaging mechanism when the first engaging component is in the locking mode.

These and other objectives of the present disclosure will no doubt become obvious to those of ordinary skill in the art after reading the following detailed description of the preferred embodiment that is illustrated in the various figures and drawings.

DETAILED DESCRIPTION

Figure 1:
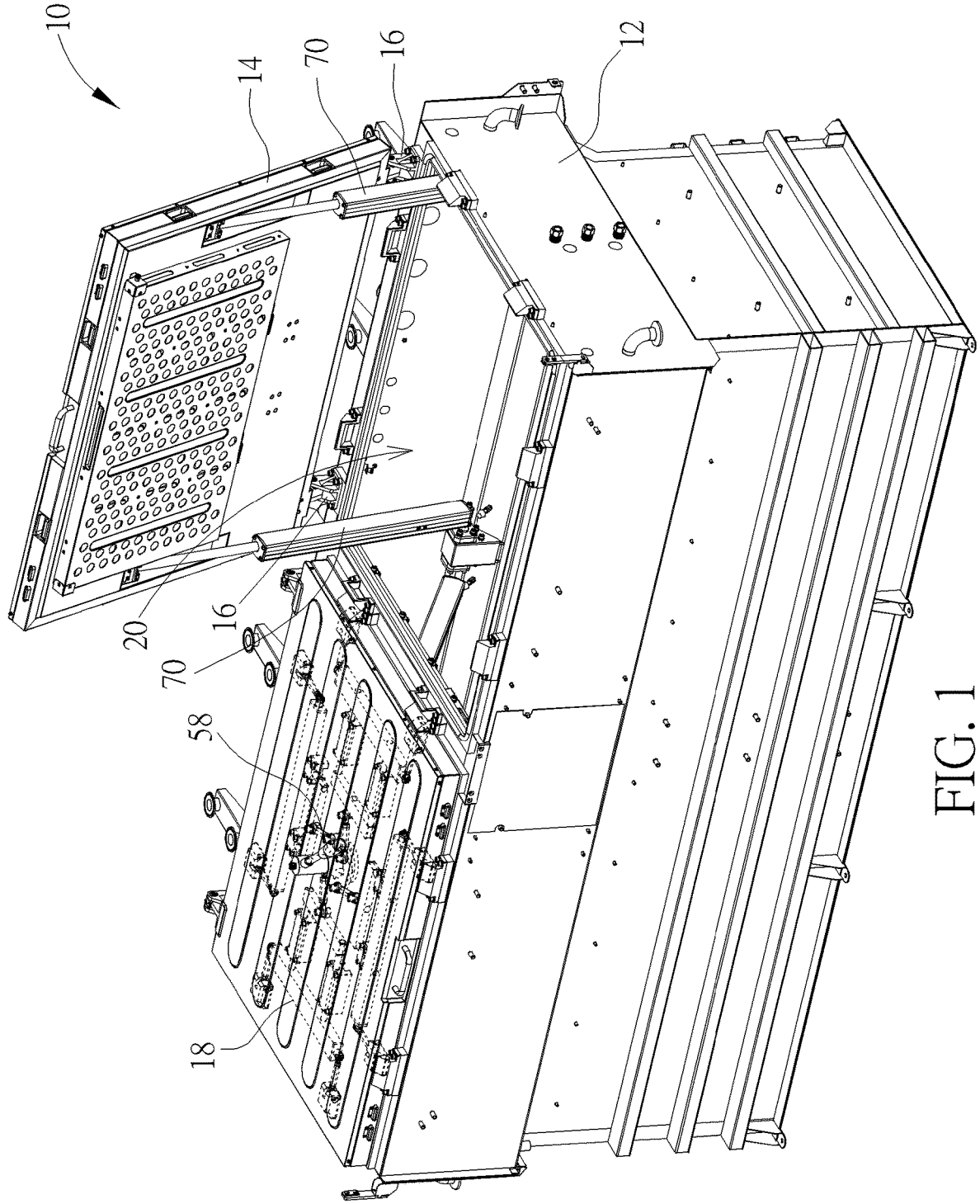
FIG. 1 is a diagram of an airtight device according to an embodiment of the present disclosure.

Please refer to FIG. 1. FIG. 1 is a diagram of an airtight device 10 according to an embodiment of the present disclosure. The airtight device 10 can include a housing 12, a cover 14, a liftable hinge mechanism 16 and a reciprocating engaging mechanism 18. The liftable hinge mechanism 16 and the reciprocating engaging mechanism 18 can be respectively disposed between the housing 12 and the cover 14. The cover 14 can be connected to the housing 12 in a rotatable and shiftable manner via the liftable hinge mechanism 16, which means the cover 14 can be liftable relative to the housing 12. The cover 14 can prevent gaseous matter inside the housing 12 from leakage via the reciprocating engaging mechanism 18. The reciprocating engaging mechanism 18 can simultaneously press and release all sides of the cover 14, so that the cover 14 can be locked and unlocked rapidly. The housing 12 has an accommodating space 20, and an electronic apparatus (which is not shown in the figure) can be disposed inside the accommodating space 20 for cooling. The cover 14 can be rotated and lifted relative to the housing 12 for exposing or sealing the accommodating space 20.

Figure 2:
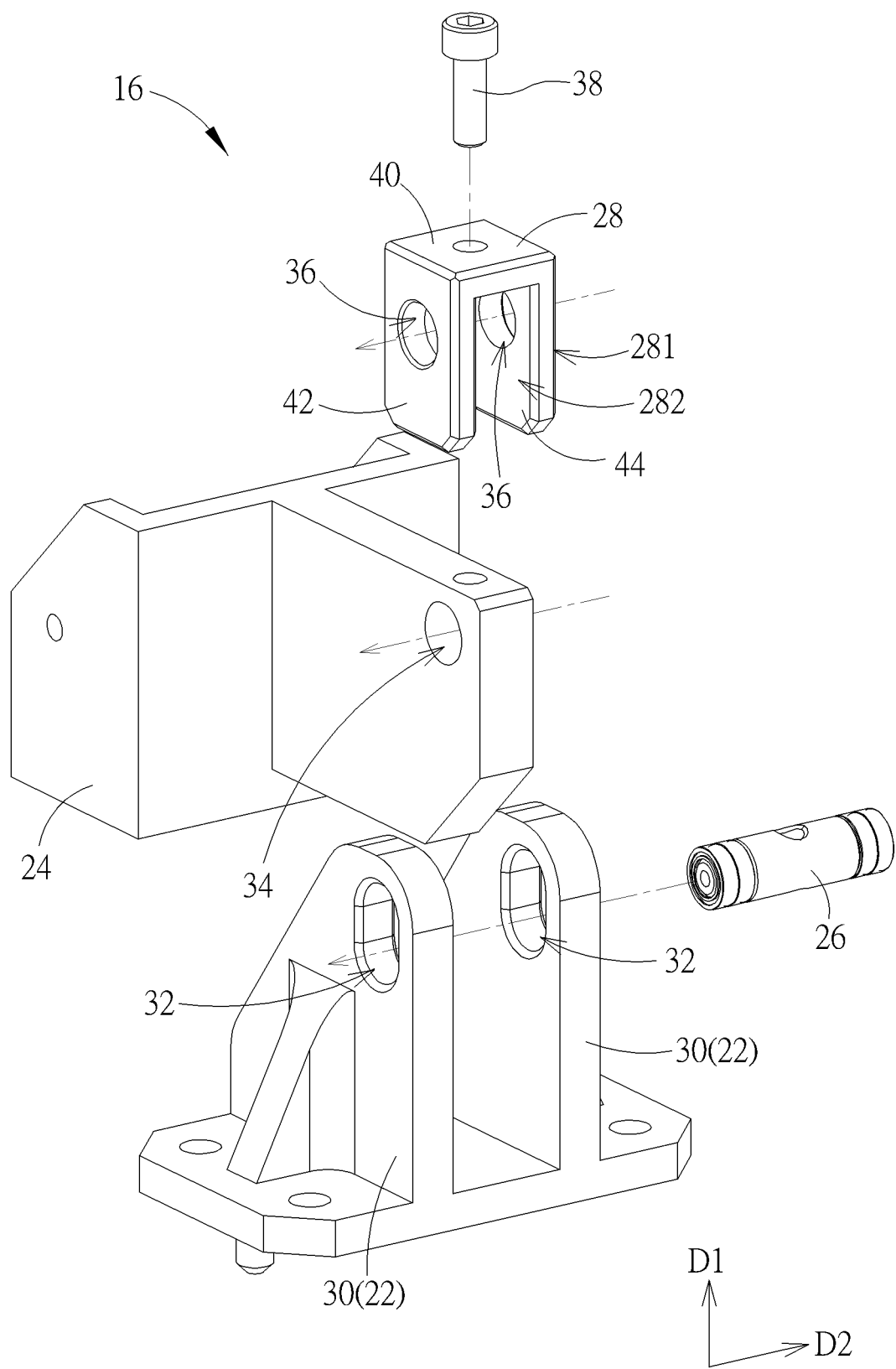
FIG. 2 is an exploded diagram of a liftable hinge mechanism according to the embodiment of the present disclosure.
Figure 3:
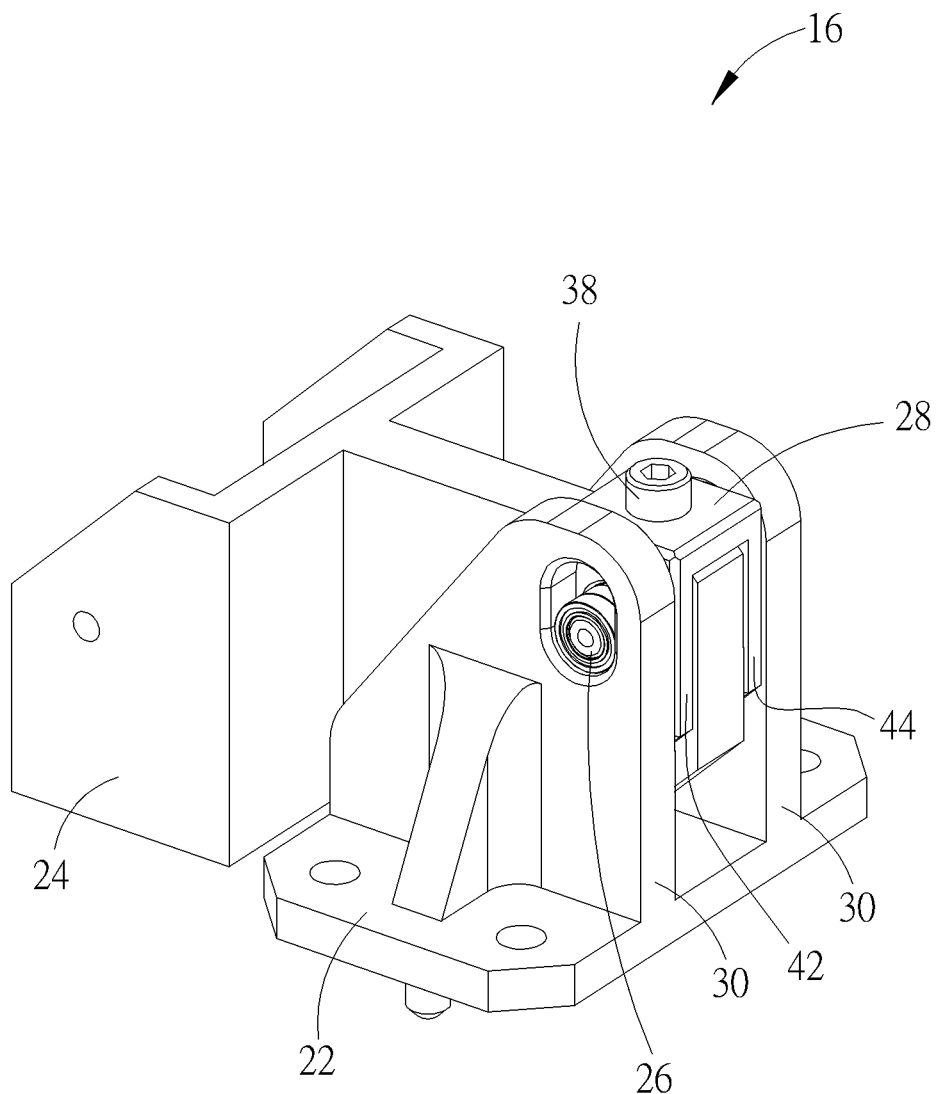
FIG. 3 is an assembly diagram of the liftable hinge mechanism according to the embodiment of the present disclosure.

Please refer to FIG. 2 and FIG. 3. FIG. 2 is an exploded diagram of the liftable hinge mechanism 16 according to the embodiment of the present disclosure. FIG. 3 is an assembly diagram of the liftable hinge mechanism 16 according to the embodiment of the present disclosure. The liftable hinge mechanism 16 can include a base 22, a connecting component 24, a pin 26 and a constraining component 28. The base 22 can be disposed on the housing 12, and optionally have one or several slab portions 30. In the present disclosure, the base 22 can include two slab portions 30. Each slab portion 30 can have a narrow slot, such as the long-type narrow slot 32. An end of the connecting component 24 can be connected to the cover 14, and the other end of the connecting component 24 can have an axle hole 34. The constraining component 28 can be made by wear-resisting material, and disposed between the base 22 and the connecting component 24. The constraining component 28 can have two surfaces 281 and 282 opposite to each other, and the surfaces 281 and 282 can respectively abut against the base 22 and the connecting component 24 in a slidable manner.

The pin 26 can slidably pass through the long-type narrow slot 32 of the base 22, and rotatably insert into the axle hole 34 of the connecting component 24 and a piercing hole 36 of the constraining component 28. The connecting component 24 can be rotated relative to the base 22 via assembly of the pin 26 and the axle hole 34, and further can be shifted relative the base 22 via assembly of the pin 26 and the long-type narrow slot 32. A slot direction D1 of the long-type narrow slot 32 can be crossed by a structurally vertical direction D2 of the pin 26, so that the pin 26 can be slid inside the long-type narrow slot 32 along the slot direction D1. In the present disclosure, the slot direction D1 may be perpendicular to the structurally vertical direction D2, which depends on an actual demand. The pin 26 can insert into the long-type narrow slot 32, the axle hole 34 and the piercing hole 36 along the structurally vertical direction D2. When the cover 14 is rotated, the connecting component 24 can be actuated to move the pin 26 inside the long-type narrow slot 32.

In the present disclosure, the base 22 includes two slab portions 30. The connecting component 24 can be clipped by the two slab portions 30 for preventing the connecting component 24 and the base 22 from separation. The constraining component 28 can be a U-type structure. A bottom portion 40 of the U-type structure can be fixed onto the connecting component 24 via a fixing component 38. Two lateral portions 42 and 44 can be stretched from opposite sides of the bottom portion 40. Each of the lateral portions 42 and 44 can insert into space between the connecting component 24 and the corresponding slab portion 30. The lateral portions 42 and 44 can respectively have the surfaces 281 and 282. The fixing component 38 can be a screw or a bolt. In other possible embodiment, the base 22 may have one slab portion 30, and the connecting component 24 may laterally abut against the slab portion 30, so as to assemble the connecting component 24 with the base 22 via the pin 26 in a movable manner; the said possible embodiment is not shown in the figures.

Figure 4:
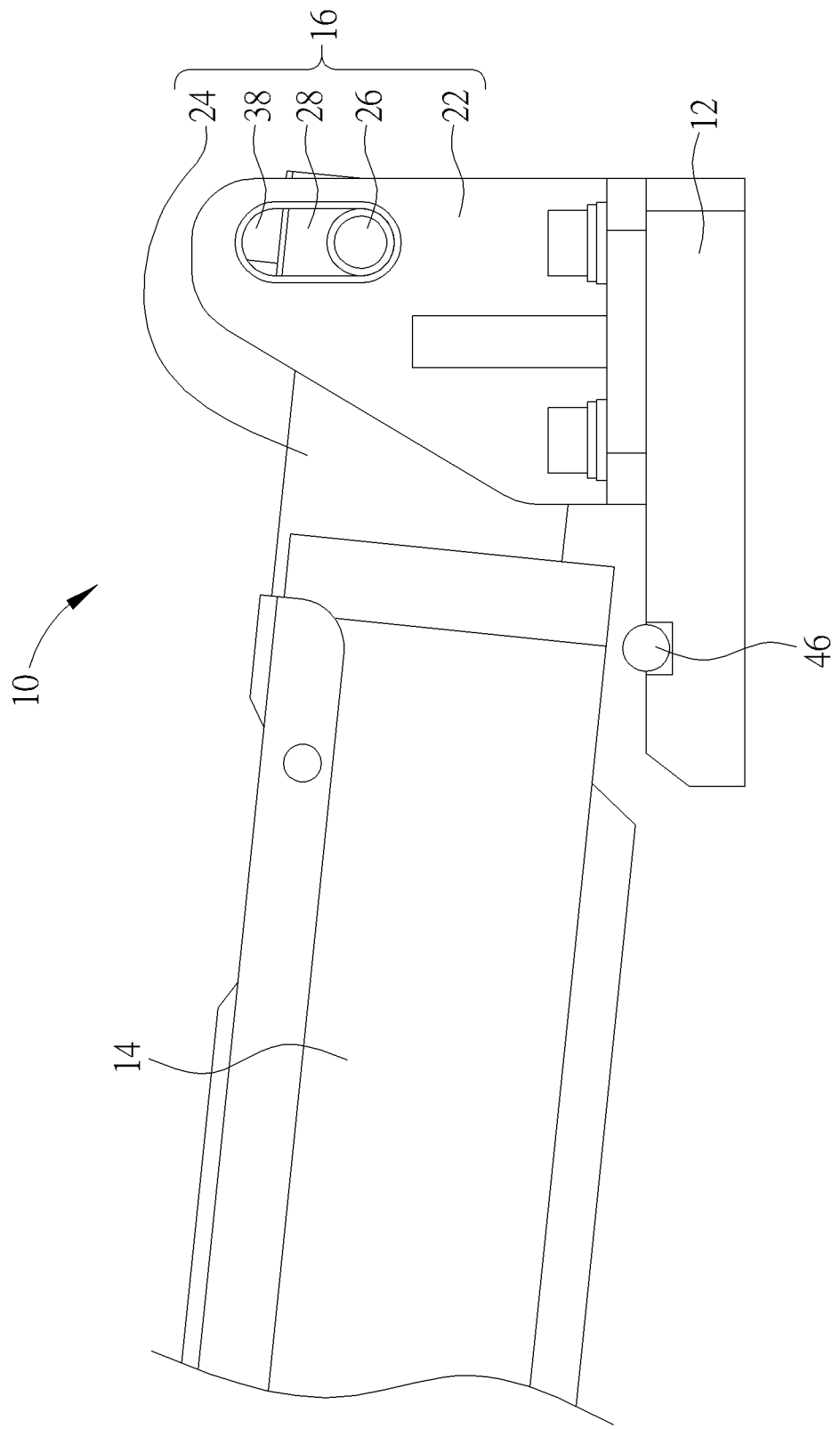
FIG. 4 to FIG. 6 are diagrams of the liftable hinge mechanism in different operation modes according to the embodiment of the present disclosure.
Figure 5:
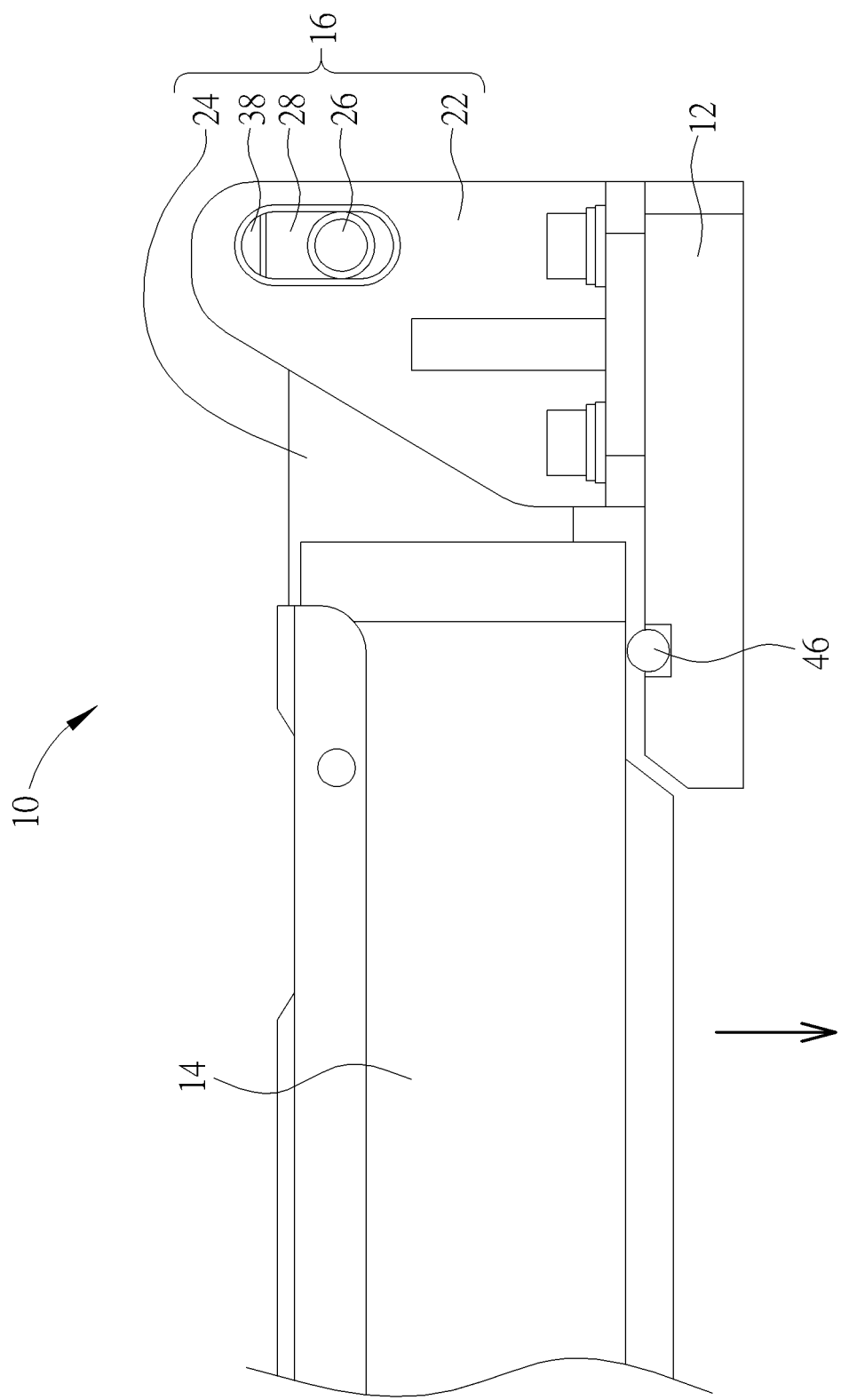
Figure 6:
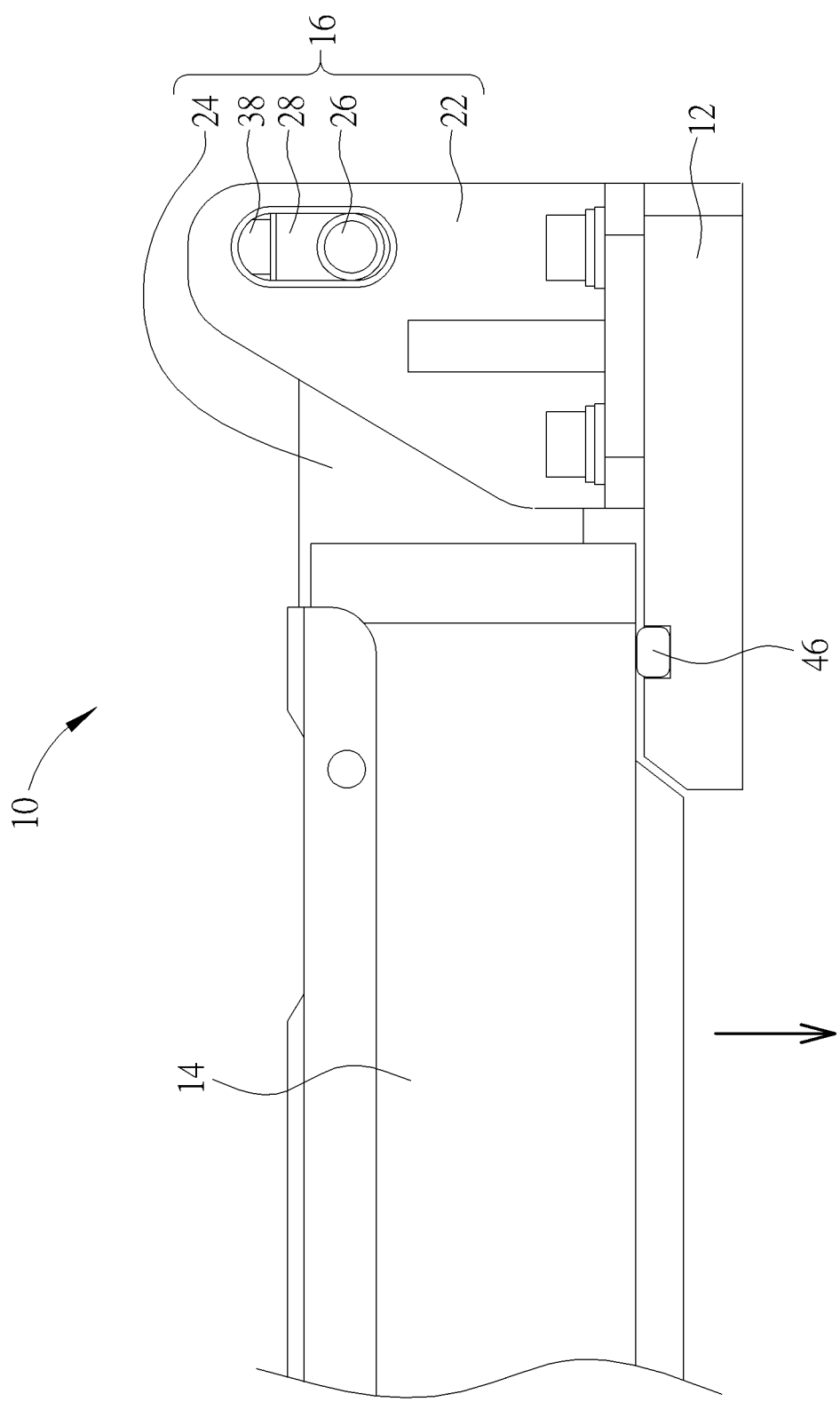

Please refer to FIG. 4 to FIG. 6. FIG. 4 to FIG. 6 are diagrams of the liftable hinge mechanism 16 in different operation modes according to the embodiment of the present disclosure. As shown in FIG. 4, the cover 14 is prepared to rotate and unfold relative to the housing 12, and the pin 26 can be lowered to a bottom of the long-type narrow slot 32 when being pressed by the cover 14; in the meantime, the cover 14 does not press a resilient gasket 46 disposed inside a groove (which is not shown in the figures) on the housing 12. As shown in FIG. 5, when the cover 14 is flat, weight of the cover 14 is borne by the whole resilient gasket 46; in the meantime, the pin 26 is not pressed by the cover 14, and the pin 26 can be slightly lifted from the bottom of the long-type narrow slot 32. Final, as shown in FIG. 6, the airtight device 10 can utilize the reciprocating engaging mechanism 18 to press and lock the cover 14 with the housing 12, which means the cover 14 can be set in a level state and then lowered along a vertical direction D3, and the resilient gasket 46 can be resiliently deformed by uniform pressure from the cover 14; the pin 26 can be lowered back to the bottom of the long-type narrow slot 32. Therefore, the airtight device 10 can utilize the liftable hinge mechanism 16 to slightly move the cover 14 vertically and further to rotate the cover 14 relative to the housing 12; further, vertical motion of the cover 14 can be driven by the reciprocating engaging mechanism 18, and rotation of the cover 14 can be driven by an electric actuator 70.

Figure 7:
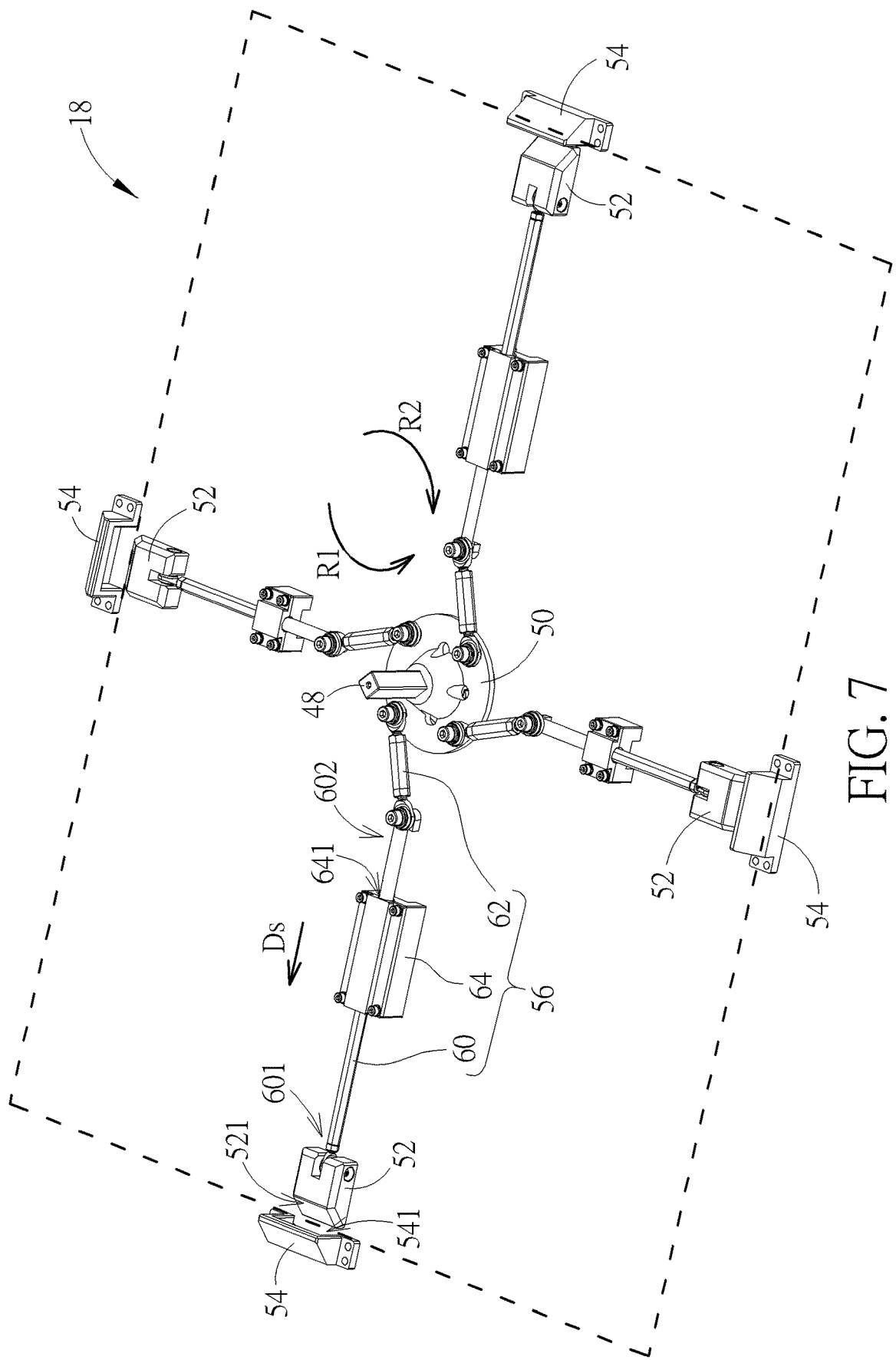
FIG. 7 and FIG. 8 are diagrams of a reciprocating engaging mechanism in different operation modes according to a first embodiment of the present disclosure.
Figure 8:
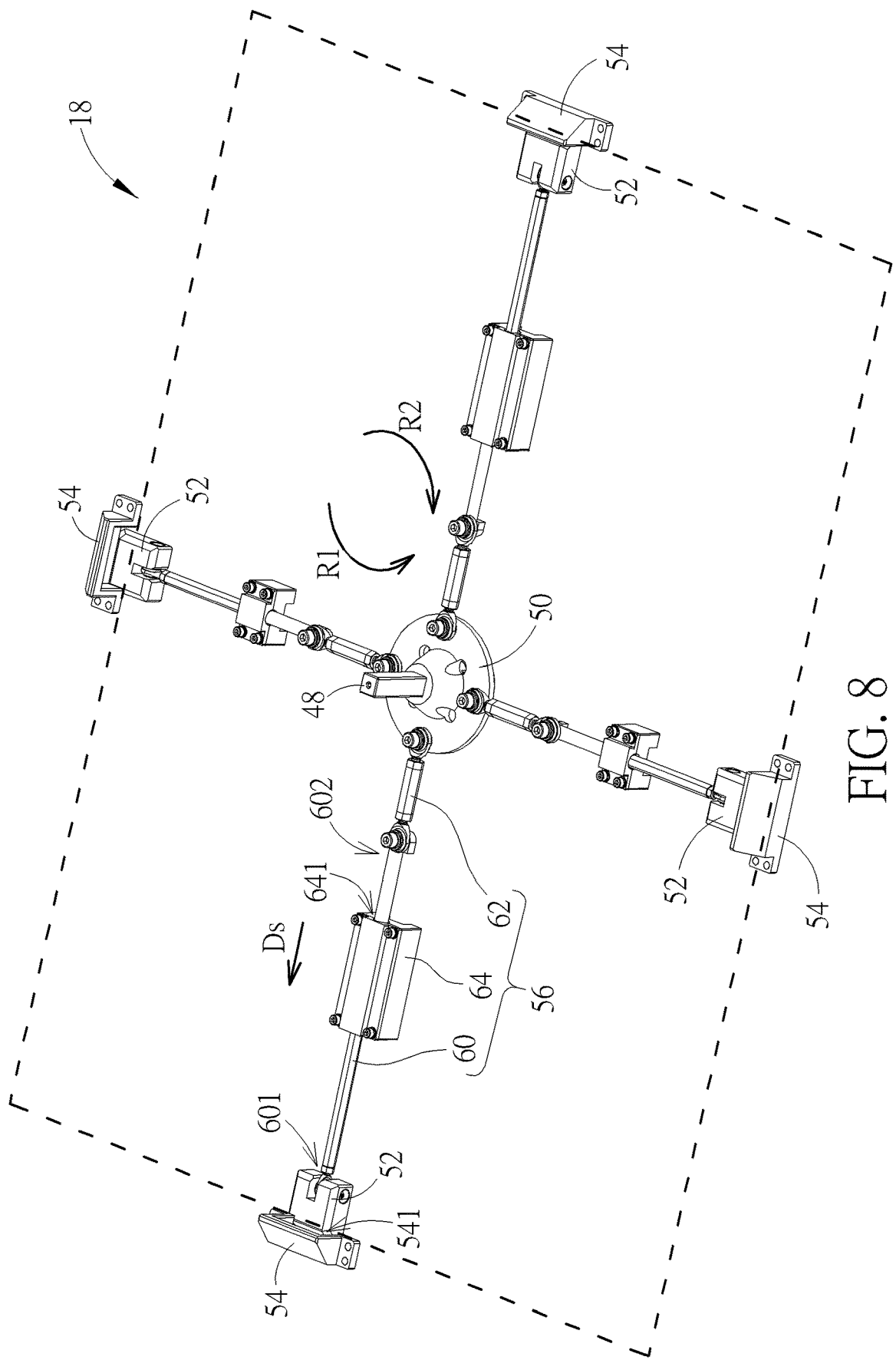

Please refer to FIG. 7 and FIG. 8. FIG. 7 and FIG. 8 are diagrams of the reciprocating engaging mechanism 18 in different operation modes according to a first embodiment of the present disclosure. The reciprocating engaging mechanism 18 can include a shaft 48, a rotary plate 50, a first engaging component 52, a second engaging component 54 and a linkage module 56. The shaft 48 can be disposed on the cover 14. The rotary plate 50 can be rotatably connected to the shaft 48. The first engaging component 52 can be connected to the rotary plate 50 via the linkage module 56. The second engaging component 54 can be disposed on the housing 12. The linkage module 56 can include a first guiding bar 60, a bridging bar 62 and a restraining component 64. A first end 601 of the first guiding bar 60 can be connected to the first engaging component 52. The bridging bar 62 can be disposed between the rotary plate 50 and a second end 602 of the first guiding bar 60. The restraining component 64 can be disposed on the cover 14 and cover the first guiding bar 60. The first guiding bar 60 can pass through an inner narrow slot 641 of the restraining component 64, so that the first guiding bar 60 can be moved along a specific direction Ds to actuate the first engaging component 52.

The shaft 48 can be connected to a handle 58, which can be shown in FIG. 1. When the handle 58 is pressed to actuate the reciprocating engaging mechanism 18 for rotating the rotary plate 50, rotation of the rotary plate 50 can drive the bridging bar 62 to move the first guiding bar 60 along the specific direction Ds via the restraining component 64. If the rotary plate 50 is rotated in a counterclockwise direction R1, the linkage module 56 can switch the first engaging component 52 from an unlocking mode shown in FIG. 7 to a locking mode shown in FIG. 8, which means the first engaging component 52 is moved from one position far from the second engaging component 54 to another position that inserts into the second engaging component 54. If the rotary plate 50 is rotated in a clockwise direction R2, the linkage module 56 can switch the first engaging component 52 from the locking mode shown in FIG. 8 to the unlocking mode shown in FIG. 7; that is, the first engaging component 52 can be separated from the second engaging component 54, and the cover 14 can be freely rotated relative to the housing 12.

It should be mentioned that the first engaging component 52 can have a first inclined guiding surface 521, and the second engaging component 54 can have a second inclined guiding surface 541. The first inclined guiding surface 521 can be slid relative to the second inclined guiding surface 541 when the first engaging component 52 inserts into the second engaging component 54, so that a level force applied to the first engaging component 52 can be transformed into a vertical force via relative slide between the first inclined guiding surface 521 and the second inclined guiding surface 541. The first engaging component 52 can be perpendicularly lowered in a small range by pressure from the second engaging component 54, and the cover 14 can be uniformly lowered accordingly to deform the resilient gasket 46. The resiliently deformed resilient gasket 46 can be filled in space between the housing 12 and the cover 14 for airtight function.

Figure 9:
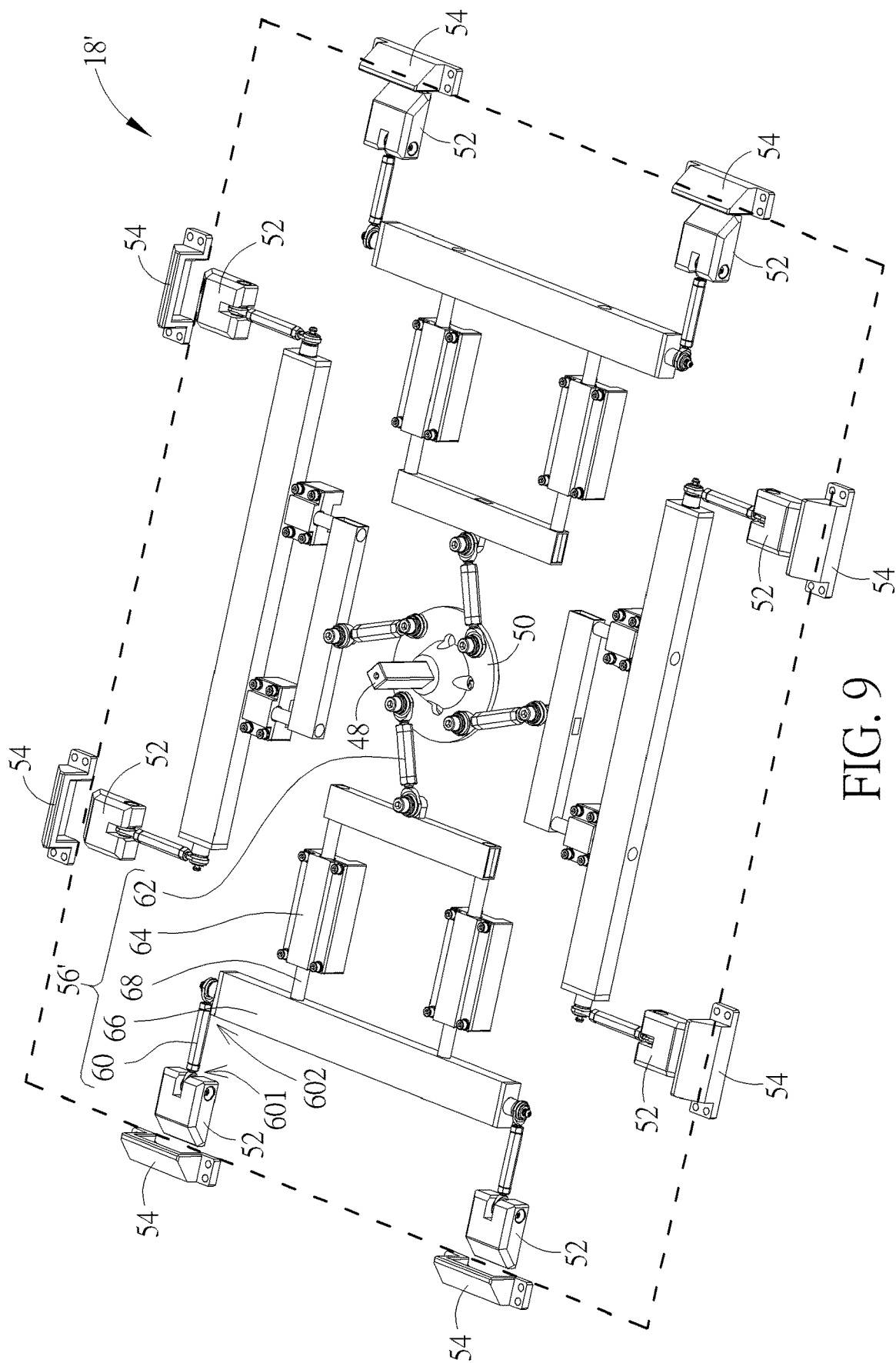
FIG. 9 is a diagram of the reciprocating engaging mechanism according to a second embodiment of the present disclosure.

Please refer to FIG. 9. FIG. 9 is a diagram of the reciprocating engaging mechanism 18' according to a second embodiment of the present disclosure. In the second embodiment, elements having the same numerals as ones of the first embodiment have the same structures and functions, and a detailed description is omitted herein for simplicity. The linkage module 56' of the reciprocating engaging mechanism 18' can further include a transferring component 66 and a second guiding bar 68. The transferring component 66 can be connected to the second end 602 of the first guiding bar 60. The second guiding bar 68 can be disposed between the transferring component 66 and the bridging bar 62. The bridging bar 62 can be directly connected to the second guiding bar 68, or can be connected to the second guiding bar 68 through any component similar to the transferring component 66. The restraining component 64 can cover one or both the first guiding bar 60 and the second guiding bar 68. An amount of the restraining component 64 depends on a design demand.

The transferring component 66 can be a sliding block or a sliding bar; any component capable of providing force transmission between the first guiding bar 60 and the second guiding bar 68, or between the second guiding bar 68 and the bridging bar 62 can belong to a scope of the transferring component 66 in the present disclosure, and other possible embodiments are omitted herein for simplicity. If the cover 14 has the large dimensions, the linkage module 56' in the second embodiment can connect the first guiding bar 60 with the second guiding bar 68 via the transferring component 66 to form a multi-stage force transmission mechanism, for preventing the guiding bar from being bent due to excessive length. Amounts and connective positions of the first guiding bar 60, the restraining component 64, the transferring component 66 and the second guiding bar 68 of the reciprocating engaging mechanism 18' are not limited to the second embodiment, and can be varied according to the design demand.

Figure 10:
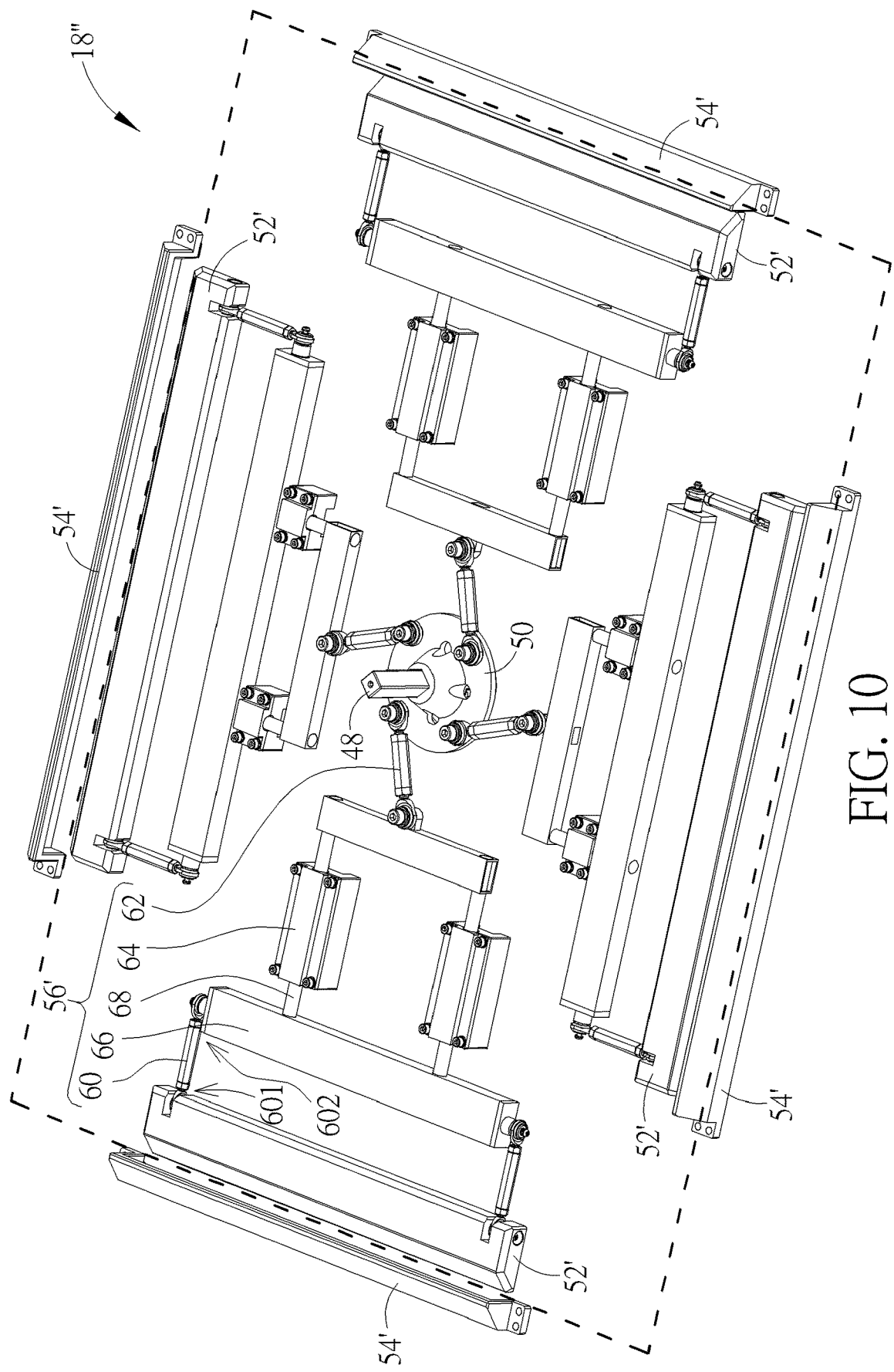
FIG. 10 is a diagram of the reciprocating engaging mechanism according to a third embodiment of the present disclosure.

Please refer to FIG. 10. FIG. 10 is a diagram of the reciprocating engaging mechanism 18" according to a third embodiment of the present disclosure. In the third embodiment, elements having the same numerals as ones of the foresaid embodiments have the same structures and functions, and a detailed description is omitted herein for simplicity. In the first embodiment and the second embodiment, each first guiding bar 60 can be connected to one first engaging component 52. In the third embodiment, the reciprocating engaging mechanism 18" can enlarge a width of the first engaging component 52', and several first guiding bars 60 can be connected to the same first engaging component 52'. Then, a width of the second engaging component 54' can be enlarged to match with the width of the first engaging component 52'. In other possible embodiment, a width of the first guiding bar and/or the second guiding bar can be optionally enlarged to decrease amounts of the first guiding bar and the second guiding bar.

In conclusion, the airtight device of the present disclosure can put the electronic apparatus into the housing, and seal the accommodating space of the housing by the cover; multi-dimensionally liftable motion of the cover can be provided by the liftable hinge mechanism and the reciprocating engaging mechanism. For increasing airtight efficiency between the cover and the housing, the present disclosure can connect the liftable hinge mechanism between the cover and the housing. When the cover is rotated relative to the housing for folding and unfolding, the cover can be lifted and lowered relative to the housing in the level state due to rotatable and slidable motion of the pin inside the long-type narrow slot of the base and the axle hole of the connecting component. For example, the resilient gasket can have four sections connected to each other, and has a shape of the four connected sections corresponding to an opening of the accommodating space. The cover can simultaneously press the four sections of the resilient gasket when being levelly lowered, which means the four sections of the resilient gasket have the same deformed compression; therefore, the resilient gasket is not unevenly pressed and not moved out of the groove on the housing, and the cover is not deformed or bent by pressing some part of the resilient gasket out of the groove.

Besides, the present disclosure can set the reciprocating engaging mechanism between the cover and the housing. The reciprocating engaging mechanism can dispose one or several first engaging components on each side of the cover, and further dispose one or several second engaging components on the housing corresponding to the first engaging components. The handle can be actuated to rotate the rotary plate of the linkage module, and the rotation of the rotary plate can drive the bridging bar, the guiding bar and the transferring component to shift and switch the first engaging component into the locking mode or the unlocking mode. The rotary plate can be rotated to forty-dive degrees, which depends on the actual demand. The amount of the first engaging component, the second engaging component, the first guiding bar, the second guiding bar, the bridging bar and the transferring component can be plural, and the actual amount can be set according to the design demand. The present disclosure can utilize small rotation of the linkage module to simultaneously assemble the plurality of engaging components with each other, so as to assemble the housing with the cover in an effort-saving and rapid manner.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A liftable hinge mechanism, comprising:
a base, having a narrow slot;
a connecting component, having an axle hole;
a pin slidably passing through the narrow slot and rotatably inserting into the axle hole, multi-dimensionally liftable motion of the connecting component relative to the base being generated via a movement of the pin inside the narrow slot and the axle hole; and
a constraining component disposed between the base and the connecting component, two opposite surfaces of the constraining component respectively abutting against the base and the connecting component in a slidable manner.

2. The liftable hinge mechanism of claim 1, wherein the narrow slot is a long-type narrow slot, a slot direction of the long-type narrow slot is crossed with a structurally vertical direction of the pin, and the pin is slid inside the long-type narrow slot along the slot direction.

3. The liftable hinge mechanism of claim 1, wherein the base comprises two slab portions, each of the two slab portions has the narrow slot, the connecting component is disposed between the two slab portions.

4. An airtight device of preventing gaseous matter from leakage, comprising:
a housing;
a cover movably assembled with the housing; and
a liftable hinge mechanism connected to the housing and the cover, the liftable hinge mechanism comprising:
a base disposed on the housing and having a narrow slot;
a connecting component connected to the cover and having an axle hole;
a pin slidably passing through the narrow slot and rotatably inserting into the axle hole, multi-dimensionally liftable motion of the connecting component relative to the base being generated via a movement of the pin inside the narrow slot and the axle hole, so as to seal the housing by the cover for preventing the gaseous matter inside the housing from leakage; and
a constraining component disposed between the base and the connecting component, two opposite surfaces of the constraining component respectively abut against the base and the connecting component in a slidable manner.

5. The airtight device of claim 4, wherein the narrow slot is a long-type narrow slot, a slot direction of the long-type narrow slot is crossed with a structurally vertical direction of the pin, and the pin is slid inside the long-type narrow slot along the slot direction.

6. The airtight device of claim 4, wherein the base comprises two slab portions, each of the two slab portions has the narrow slot, the connecting component is disposed between the two slab portions.

7. A reciprocating engaging mechanism, comprising:
a shaft;
a rotary plate rotatably disposed on the shaft;
a first engaging component; and
a linkage module, an end of the linkage module being connected to the rotary plate in a rotatable manner, rotation of the rotary plate driving the linkage module to move and switch the first engaging component between a locking mode and an unlocking mode.

8. The reciprocating engaging mechanism of claim 7, further comprising:
a second engaging component disposed on position corresponding to the locking mode, the first engaging component being switched into the locking mode by inserting into the second engaging component, and further switched into the unlocking mode by being separated from the unlocking mode.

9. The reciprocating engaging mechanism of claim 7, wherein the linkage module comprises:
a first guiding bar, an end of the first guiding bar being connected to the first engaging component for switching the first engaging component into the locking mode or the unlocking mode; and
a bridging bar disposed between the rotary plate and the first guiding bar.

10. The reciprocating engaging mechanism of claim 9, wherein the linkage module further comprises:
a restraining component adapted to cover the first guiding bar for allowing the first guiding bar to move along a specific direction.

11. The reciprocating engaging mechanism of claim 9, wherein the linkage module further comprises
a transferring component connected to the other end of the first guiding bar; and a second guiding bar disposed between the transferring component and the bridging bar.

12. The reciprocating engaging mechanism of claim 9, wherein an amount of the first guiding bar is plural, and an amount of the first engaging component corresponds to the amount of the first guiding bar.

13. An airtight device of preventing gaseous matter from leakage, comprising:
- a housing;
- a cover movably assembled with the housing; and
- a reciprocating engaging mechanism adapted to constrain a movement of the cover relative to the housing, the reciprocating engaging mechanism comprising:
  - a shaft disposed on the cover;
  - a rotary plate rotatably disposed on the shaft;
  - a first engaging component;
  - a second engaging component disposed on the housing; and
  - a linkage module, an end of the linkage module being connected to the rotary plate in a rotatable manner, rotation of the rotary plate driving the linkage module to move and switch the first engaging component between a locking mode and an unlocking mode, so as to tightly shelter the housing by the cover for preventing the gaseous matter inside the housing from leakage.

14. The airtight device of claim 13, wherein the second engaging component is disposed on position corresponding to the locking mode, the first engaging component is switched into the locking mode by inserting into the second engaging component, and further switched into the unlocking mode by being separated from the unlocking mode.

15. The airtight device of claim 13, wherein the linkage module comprises:
- a first guiding bar, an end of the first guiding bar being connected to the first engaging component for switching the first engaging component into the locking mode or the unlocking mode; and
- a bridging bar disposed between the rotary plate and the first guiding bar.

16. The airtight device of claim 15, wherein the linkage module further comprises:
- a restraining component adapted to cover the first guiding bar for allowing the first guiding bar to move along a specific direction.

17. The airtight device of claim 15, wherein the linkage module further comprises
- a transferring component connected to the other end of the first guiding bar; and
- a second guiding bar disposed between the transferring component and the bridging bar.

18. The airtight device of claim 15, wherein an amount of the first guiding bar is plural, and an amount of the first engaging component corresponds to the amount of the first guiding bar.

* * * * *